United States Patent
Fox et al.

(10) Patent No.: US 11,223,588 B2
(45) Date of Patent: Jan. 11, 2022

(54) USING SENSOR DATA TO CONTROL MESSAGE DELIVERY

(71) Applicant: INTERNATIONAL BUSINESS MACHINES CORPORATION, Armonk, NY (US)

(72) Inventors: Jeremy R. Fox, Georgetown, TX (US); Lisa Seacat DeLuca, Baltimore, MD (US); Kelley Anders, East New Market, MD (US); Jeremy A. Greenberger, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 300 days.

(21) Appl. No.: 16/135,237

(22) Filed: Sep. 19, 2018

(65) Prior Publication Data

US 2020/0092239 A1 Mar. 19, 2020

(51) Int. Cl.
*H04L 12/58* (2006.01)
*H04L 29/08* (2006.01)

(52) U.S. Cl.
CPC .............. *H04L 51/12* (2013.01); *H04L 51/14* (2013.01); *H04L 67/12* (2013.01)

(58) Field of Classification Search
CPC .......... H04L 51/12; H04L 51/14; H04L 67/12
See application file for complete search history.

(56) References Cited

U.S. PATENT DOCUMENTS

| 4,924,072 A * | 5/1990 | Oslin ...................... A47J 27/04 |
| | | 219/400 |
| 7,373,428 B1 * | 5/2008 | Armstrong .............. H04L 67/22 |
| | | 370/349 |

(Continued)

FOREIGN PATENT DOCUMENTS

WO 2016054605 A2 4/2016

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Douglas B Blair
(74) *Attorney, Agent, or Firm* — Caleb D. Wilkes

(57) ABSTRACT

A method, computer system, and computer program product for using sensor data to control message delivery to a user. The method may include defining one or more criteria which may include a message delivery, sensor, bypass, or rerouting criterion. The message delivery criterion may include a rule for delivering messages. The method may include operations performed by a device communicating with a communications network. The device may have a computer and may receive a message from a user of a plurality of users and data from a sensor. The method may determine whether the sensor data meets the message delivery criterion and suppress a message notification based on the message delivery criterion. In some embodiments, the sensor is an image sensor and the method includes determining that content of (Continued)

Database

| Sensor 106 | Sensor Criteria 132 | Delivery Criteria 134 |
|---|---|---|
| Thermal | X > 350° F | Don't Deliver |
| Motion | X > 2 mph | Don't Deliver |
| Image Recognition | Meeting | Don't Deliver |

114 an image captured by the image sensor includes an activity corresponding with a message delivery criterion.

17 Claims, 7 Drawing Sheets

(56) References Cited

U.S. PATENT DOCUMENTS

| | | | |
|---|---|---|---|
| 8,726,343 B1 | 5/2014 | Borzycki et al. | |
| 9,904,962 B1 | 2/2018 | Bastide et al. | |
| 2004/0030531 A1* | 2/2004 | Miller | G06F 19/00 702/182 |
| 2004/0039786 A1* | 2/2004 | Horvitz | H04L 51/12 709/207 |
| 2004/0143636 A1* | 7/2004 | Horvitz | H04L 29/06 709/207 |
| 2004/0254998 A1* | 12/2004 | Horvitz | H04L 67/16 709/206 |
| 2008/0016544 A1* | 1/2008 | Lee | H04N 21/4333 725/134 |
| 2010/0083182 A1* | 4/2010 | Liu | H04N 21/482 715/843 |
| 2010/0121789 A1* | 5/2010 | Bednyak | G09B 19/00 706/11 |
| 2011/0222675 A1* | 9/2011 | Chua | H04L 12/66 379/93.01 |
| 2012/0109384 A1 | 5/2012 | Stepanian | |
| 2015/0341290 A1 | 11/2015 | Cherifi et al. | |
| 2016/0028670 A1* | 1/2016 | Lott | H04L 51/14 709/206 |
| 2016/0117202 A1* | 4/2016 | Zamer | G06N 20/00 719/320 |
| 2016/0173628 A1* | 6/2016 | Newton | H04L 67/24 340/573.1 |
| 2016/0189492 A1* | 6/2016 | Hamam | G06F 3/016 340/407.1 |
| 2016/0217381 A1 | 7/2016 | Bloomquist et al. | |
| 2017/0099592 A1 | 4/2017 | Loeb et al. | |
| 2017/0116986 A1* | 4/2017 | Weng | G10L 15/22 |
| 2017/0169470 A1* | 6/2017 | Deluca | H04L 67/12 |
| 2017/0223128 A1* | 8/2017 | Shuvaev | H04W 88/06 |
| 2017/0270765 A1 | 9/2017 | Roberts et al. | |
| 2017/0316320 A1 | 11/2017 | Jamjoom et al. | |
| 2017/0367164 A1* | 12/2017 | Engelen | H05B 47/115 |
| 2018/0165061 A1* | 6/2018 | Nicolich-Henkin | H04L 12/282 |
| 2019/0372794 A1* | 12/2019 | Ocher | G06F 9/541 |

OTHER PUBLICATIONS

IFTTT, "IFTTT helps your apps and devices work together in new ways", printed on Jun. 8, 2018, 4 pages, https://ifttt.com/.

Spice, "Internet of Things Made Simple: One Sensor Package Does Work of Many", Carnegie Mellon University News, May 11, 2017, 3 pages.

* cited by examiner

Database

| Sensor 106 | Sensor Criteria 132 | Delivery Criteria 134 |
|---|---|---|
| Thermal | X > 350° F | Don't Deliver |
| Motion | X > 2 mph | Don't Deliver |
| Image Recognition | Meeting | Don't Deliver |

Database 114

| Sensor Criteria | | | 132 |
|---|---|---|---|
| Time 140 | Location 142 | Image Content 144 | Activity 146 |
| 10:00 AM | Office | More than 1 person in the office | Meeting |
| 6:00 PM | House Dining Room | 4 People | Dinner |

FIGURE 2b

Database

| Sensor 106 | Actual Sensor Data 136 | Deliver (Yes/No) 134 |
|---|---|---|
| Appliance | X > 350° F | No |
| Motion | X > 2 mph | No |
| Image Recognition | Meeting | No |

114

FIGURE 2c

USING SENSOR DATA TO CONTROL MESSAGE DELIVERY

BACKGROUND

The present invention relates generally to a method, system and computer program for using sensor data to control message delivery to a user using a device communicating with a cloud.

Oftentimes individuals are engaged in a social situation or actively working on tasks that require their full attention. Some examples of such tasks may include cooking dinner, exercising, or working. In such instances, these individuals would prefer not to receive notifications on their personal electronic devices because such notifications interrupt and distract from the task at hand.

BRIEF SUMMARY

An embodiment of the present invention may include a method, computer system, and computer program product for using sensor data to control message delivery to a user. The method may include defining one or more criteria. The criteria may include a message delivery criterion, a sensor criterion, a bypass criterion, or a rerouting criterion. The message delivery criterion may include a rule for delivering messages. The method may include operations performed by a device communicating with a communications network. The device may have a computer and may receive a message from a user of a plurality of users. The device may receive data from a sensor. The method may determine whether the sensor data meets the message delivery criterion and suppress a message notification based on the message delivery criterion.

In some embodiments, the sensor is an image sensor and the method includes determining that content of an image captured by the image sensor includes an activity corresponding with a message delivery criterion. In various embodiments, a delivery destination of the message is a second device, and the device is a computing device remotely located from the second device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

FIG. 2a is a schematic block diagram illustrating a database used in accordance with an embodiment of the invention.

FIG. 2b is a schematic block diagram illustrating a database used in accordance with an embodiment of the invention.

FIG. 2c is a schematic block diagram illustrating a database used in accordance with an embodiment of the invention.

DETAILED DESCRIPTION

Figure 1:
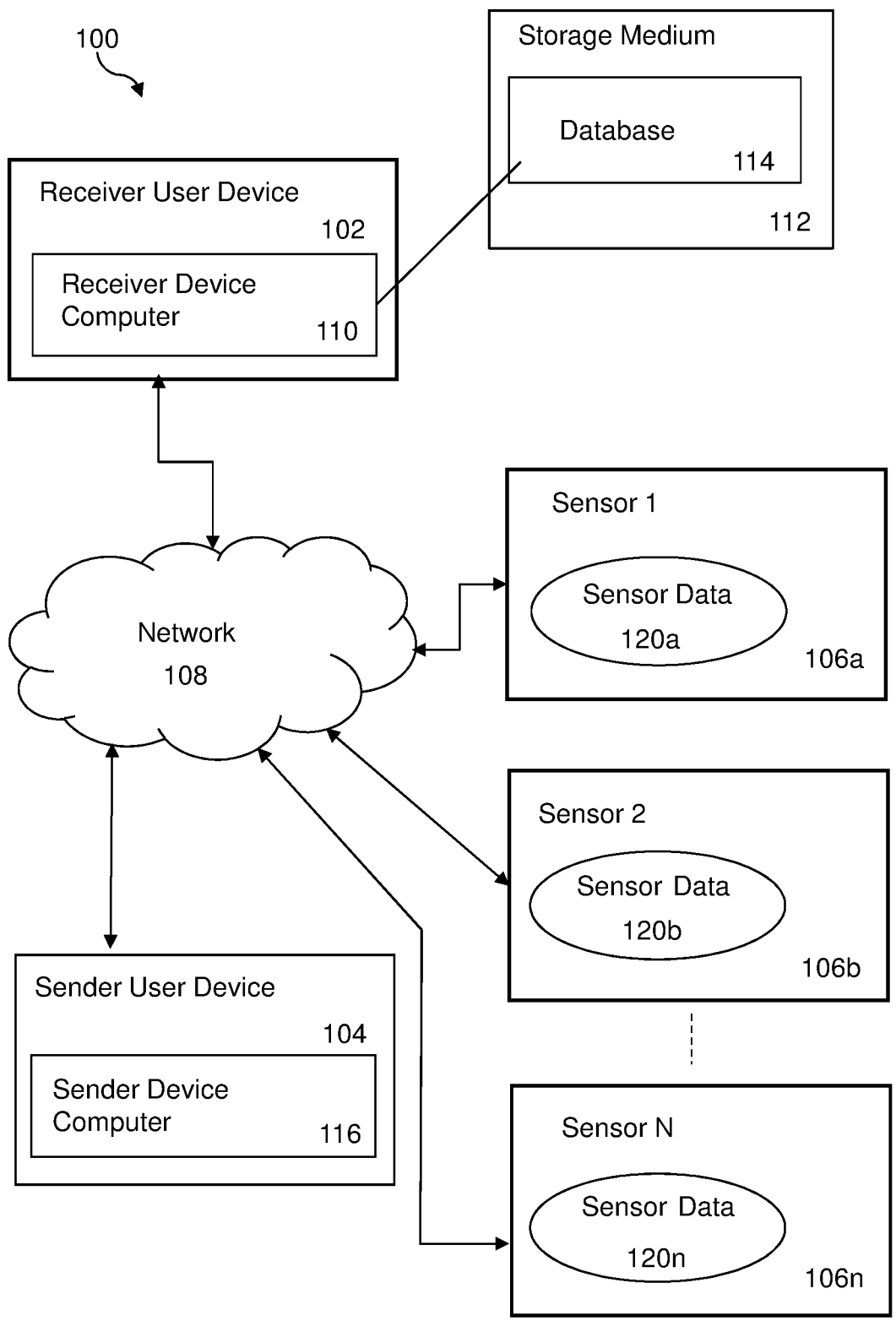
FIG. 1 is a schematic block diagram illustrating a system for using sensor data to control message delivery, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention provides a method, computer program, and computer system for using sensor data to control message delivery to a user of a user device. In an embodiment of the present invention, a user may set delivery message criteria and sensor criteria to control the delivery of messages to a user device. The user may suppress all messages. Alternatively, the user may set certain rerouting or bypass delivery criteria to allow message to be delivered to the user device.

The user may configure their mobile computing device, e.g., a mobile phone, so that message notifications are suppressed. This can be useful when the user is in a social situation, such as a meeting, in which they prefer not to be interrupted. A problem with many commercially available devices is that all messages are suppressed. While the user may generally prefer not to be interrupted, the user still wants to be interrupted to receive certain messages the particular user considers important. For example, the user may be a caretaker for a diabetic person and always wants to receive alerts from a glucose sensor continuously monitoring the diabetic person when the sensor values fall below a threshold. Another user may want to be notified if the temperature in a wine cellar rises above a certain level. There can be many different personal reasons for wanting to bypass a message notification suppression feature. However, the mobile phone may provide for suppressing all message alerts or not suppressing any alerts.

A second problem with receiving undesired message notifications on a mobile device is that the devices are typically battery powered and the message notifications consume battery power. Message notifications may generate a sound, activate a micro vibration motor, illuminate a display, or use a combination of these mechanisms. These mechanisms all require electrical power and any reduction in the number of message notifications may result in an incremental increase in battery time between charging.

Accordingly, at least some of the embodiments described herein provide a technical solution to the problems described above with respect to mobile computing devices. Specifically, some embodiments described herein provide a message notification suppression mechanism that may be at a Cloud location remote from a user's device, e.g., a mail server, an SMS message server, or a voice call server. The message notification suppression mechanism permits each end user to select specific sensors and customize sensor criteria that triggers the suppression function. In addition, the remote message notification suppression mechanism provides customizable bypass and rerouting functions that permit a user to be interrupted to receive certain messages considered important, a feature that may not be available locally on commercially available mobile computing devices. The remotely located message notification suppression mechanism recognizes messages intended for particular users by inspecting a delivery destination included with each message and applies customized message delivery criteria that may be unique for each user. Moreover, the embodiments described herein may reduce power consumption by preventing a device from activating message notifications mechanisms. Further, when multiple message notifications that were suppressed are later delivered when the user is receiving messages, the suppressed notifications may be batched and delivered with a single message notification.

Reference will now be made in detail to the embodiments of the present invention, examples of which are illustrated in the accompanying drawings, wherein like reference numerals refer to like elements throughout. Embodiments of the invention are generally directed to using sensor data to control message delivery.

In an embodiment of the present invention, the user device is a mobile terminal such as a smartphone but is not limited to such. Other examples include user's laptop computer, tablet, desktop computer, or a peripheral device such as a smartwatch or other wearable device, or any programmable electronic device supporting the functionality required by one or more embodiments of the invention.

Notifications can be for a variety of events. Some examples of notifications may include, but are not limited to, incoming email or text message, incoming voice call, an urgent weather or public safety alert, a new online post to a social media or news site that the user has opted to be notified about.

An embodiment of the present invention encompasses a database which may be stored in the local memory of the user's smartphone or other portable device itself. The database may also be stored in a cloud where the database and analytics are on one or more servers remote from the user's device but in electronic communication therewith.

FIG. 1 illustrates a sensor data delivery control system 100, in accordance with an embodiment of the present invention. In an example embodiment, sensor data delivery control system 100 includes a receiver user device 102, a sender user device 104, a plurality of sensors 106a, 106b, 106n, all connected via one or more networks 108.

The receiver user device 102 contains a receiver device computer 110 that hosts a storage medium 112. Storage medium 112 comprises a database 114. The sender user device 104 contains a sender device computer 116. The receiver device computer 110 and sender device computer 116 may be instances of the computer 1010 or server 1100 shown in FIG. 5.

The plurality of sensors may include a first sensor 106a, a second sensor 106b and Nth sensor 106n. Although FIG. 1 shows three sensors, sensor 1, sensor 2 and sensor N, principles of an embodiment of the present invention are not restricted to three sensors and may be used with any number of sensors.

Sensors 106a, 106b, 106n each comprise sensor data 120a, 120b, 120n, respectively. Sensors 106 may comprise different functional components, however each sensor provides input data that is used by the methods described herein. Each sensor 106 stores information respecting its sensor activity in the designated sensor data 120. Sensors 106 may be, but are not limited to, temperature sensors, proximity sensors, accelerometers, infrared sensors, pressure sensors, light sensors, location sensors, or image recognition sensors. A sensor 106 may be included in a mobile device, such as receiver user device 102 or sender user device 104. In addition, a sensor 106 may be disposed at a fixed or semi-permanent location, such as an "Internet of Things" (IoT) device. The "Internet of Things" refers to the network of physical objects or "things" that are embedded with and/or otherwise include electronics, software, sensors, and network connectivity that allow these objects to collect and exchange data. Exemplary IoT devices include but are not limited to, thermometers, routers, clocks, phones, faxes, printers, light bulbs, garage door operating systems, refrigerators, ovens, stoves, stereos, televisions, media players and/or recorders, and so forth. Further, a sensor may also be included in a wearable health monitoring device, such as devices for monitoring heartbeat, blood pressure, blood sugar, a person's temperature, and the like.

According to various embodiments, an image sensor 106 is coupled with a computing device configured for image recognition. The computing device may include software for determining features and visual elements from digital image data provided by the image sensor 106. For example, the computing device may employ known algorithms such as deep learning convolutional neural network (CNN) techniques, edge detection algorithms, active contour algorithms, blob detection methods, scale-invariant feature transform (SIFT) algorithms, or Eigenface methods. Techniques for recognizing and classifying features and visual elements are well known in the art, and any suitable technique or combination of techniques may be employed in the computing device configured for image recognition. In various embodiments, the image sensor 106 coupled with a computing device configured for image recognition may detect the presence of people in a field of view of the image sensor 106. In some embodiments, the number and even the identity of the persons may be determined. An activity corresponding with a message delivery criterion, in some embodiments, may be defined by a user to include an identified person in sensor image content 144, e.g., a meeting with John. Objects and landmarks in the field of view may be recognized and used to determine the type of space, e.g., an office, a dining room, or outdoors. In some embodiments, multiple frames of image data may be analyzed to determine an activity engaged in by persons in the sensor's field of view, e.g., the persons are having a meeting or are having a meal.

FIG. 2a illustrates, in schematic view, different categories of information that may be stored in database 114. As shown in FIG. 1, database 114 can be located in storage medium 112 of the receiver device computer 110. Referring to FIG. 2a, the database 114 may store identification information for sensor 106, along with corresponding sensor criteria 132 and delivery criteria 134. The output of a particular sensor 106 may be evaluated with corresponding sensor criteria 132. For example, a thermal sensor on an oven may be evaluated with "greater than" 350° F. sensor criteria. Sensor criteria 132 may be, but are not limited to, thermal settings, motion settings, image recognition settings, or position settings and may correspond to user preferences.

Delivery criteria 134 provides the user with message delivery options. Delivery criteria 134 may include an option of automatic delivery or automatic suppression of a message. Other delivery criteria 134 options may include alerting the user that a message was suppressed. Delivery criteria 134 may also include routing the message to another user or bypassing the message suppression and allowing for the message to be delivered to the intended user. Alternatively, delivery criteria 134 may be set based on the output of one sensor 106 or for a plurality of sensors 106.

Referring to FIG. 2b, sensor criteria 132 of database 114 may store other factors such as time 140, location 142, image content 144 or activity 146 for certain types of sensors, e.g., a sensor that captures images. These factors may be used to determine when to deliver a message and when to suppress a message, based on the location of the user, the time of day, or the type of activity the user is engaged in. For example, at 10:00 AM, the user is at work, in the office. Image content 144 shows that there is more than one person in the office. Since more than one person is in the office, activity 146 indicates that the user is in a meeting. Alternatively, at 6:00 PM, with location 142 indicating a dining room, the user is at home. Image content 144 shows four people sitting at the dining room table. Activity 146 indicates that the user is engaged in dinner.

FIG. 2c shows how a user's activity 146 may be used to trigger different delivery criteria 134. For example, referring to the third row of FIG. 2c, because analysis of an image indicates that the user is engaged in a meeting, no messages should be delivered to the receiver user device 102. Alternatively, referring to the first row of FIG. 2c, when sensor 106 is a thermal sensor on an appliance, such as an oven, where the oven temperature is above 350° F., delivery criteria 134 is used to suppress the delivery of a message. A user may set the delivery criteria 134 to suppress messages when oven temperature is above 350° F. because the user does not want to be interrupted while cooking. Alternatively, referring to the second row of FIG. 2c, when sensor 106 is a motion sensor, such as an accelerometer, where sensor criteria 132 indicates a motion of more than 2 miles per hour, delivery criteria 134 may be set to suppress the delivery of a message because the user may be exercising and does not want to be disrupted.

Figure 3:
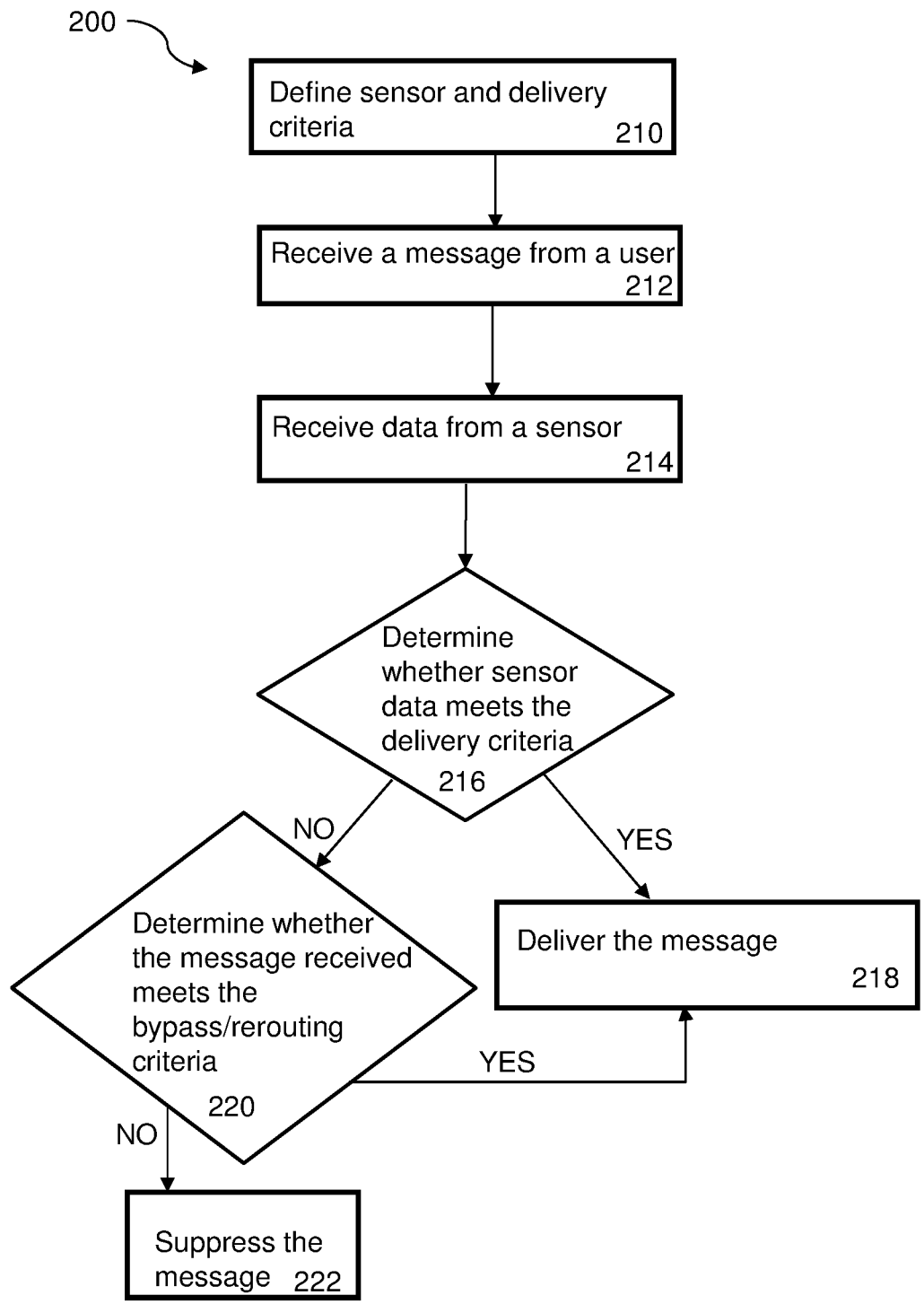
FIG. 3 is a flow chart illustrating an example method for using sensor data to control message delivery, in accordance with an embodiment of the invention.

Referring to FIG. 3, a method 200 for using sensor data to control message delivery is depicted, in accordance with an embodiment of the present invention. The method 200 is described with respect to a single sensor 106 to simplify the explanation. It should be appreciated that the method 200 may be simultaneously employed for two or more sensors. Referring to block 210, a user using the receiver user device 102 defines sensor criteria 132 for at least one sensor 106 and message delivery criteria 134. The message delivery criteria 134 may be associated with a particular sensor. Both sensor criteria 132 and message delivery criteria 134 may be stored on a memory device in a cloud 1250. Alternatively, sensor criteria 132 and message delivery criteria 134 may be stored on receiver device computer 110, or both on a memory device in the cloud 1250 and receiver device computer 110.

Referring to block 212, a message is received from sender user device 104. The sender user device 104 specifies a delivery destination for the message, which is typically the receiver user device 102. The message may be received at receiver user device 102. In some embodiments, the message may be received at an intermediate destination before it is received at the delivery destination, e.g., at a computing device in the cloud 1250 located remotely from the receiver user device 102. The message may be, but is not limited to, a phone call, a text message, an email, or a social network notification. Referring to block 214, the receiver user device 102 or computing device in cloud 1250 receives sensor data 120 from sensor 106.

Referring to block 216, it is determined whether the sensor data 120 meets delivery criteria 134. This determination may be made at receiver user device 102 or, in some embodiments, at computing device in cloud 1250 remotely located from receiver device 102. In some embodiments, operations performed at block 216 include determining that content of an image captured by an image sensor 106 includes an activity 146 corresponding with a message delivery criterion. If the sensor data 120 meets delivery criteria 134, either a message notification, the actual message, or both are delivered to the receiver user device 102 (block 218). Alternatively, the actual message may be delivered to the receiver user device 102 but only the message notification is displayed. If, at block 216, the sensor data 120 does not meet delivery criteria 134, the method advances to operation 220.

At block 220, sensor data 120 that does not meet delivery criteria 134, at step 216, is further analyzed and compared to bypass or rerouting delivery criteria 134. A user may set delivery criteria 134 specific to messages pertaining to particular events or coming from particular individuals. These delivery criteria 134 may include rerouting or bypass options based on the content of a message, such as a text message or an email. Delivery criteria 134 may also include a rerouting or bypass option based on the identity of the sender. For example, a user may set the delivery criteria 134 to suppress all messages during an office meeting, except to bypass the suppression and deliver all messages having content associated with a child's school or which are sent from someone associated with the child's school.

Alternatively, a user may set the delivery criteria 134 to suppress all messages and have them rerouted and delivered to a designated recipient. For example, when a user is in a meeting, as shown in FIG. 2b, line 2, the delivery criteria 134 may be set to suppress all messages. However, the user may be waiting for an important message concerning a child but cannot be disturbed during the meeting. The user may set the delivery criteria 134 to allow messages pertaining to the child to be rerouted to another user. Alternatively, the user may set the delivery criteria 134 to allow all messages to be rerouted to another user.

Referring to FIG. 3, block 218, if the message meets either the bypass or rerouting delivery criteria 134, a message notification, the actual message, or both, is delivered to receiver user device 102. If the message does not meet the bypass or rerouting delivery criteria 134, the message is suppressed (block 222).

According to various embodiments, the determination of whether the message received meets the bypass or rerouting criteria (block 220) may include known natural language processing techniques. The natural language processing techniques may be employed, for example, to determine from the content of a message: a topic or subject of a message, a sender or other person discussed in a message, or a key word like "urgent." The natural language processing technique may include a natural language processor that analyzes the received content in any number of natural languages. Further, the natural language processor may include various modules to analyze a received content from a social networking system or other received electronic communication content to identify characteristics about the received content.

According to various embodiments, the modules may include, but are not limited to, a tokenizer, a part-of-speech (POS) tagger, a semantic relationship identifier, and a syntactic relationship identifier. The tokenizer may be a computer module that performs lexical analysis of tokens, which may be strings of characters included in written passage and categorized as a meaningful symbol. The POS tagger may be a computer module that reads a passage or other text in natural language and assigns a part of speech to each word or other token. In some embodiments, the POS tagger may determine the part of speech to which a word (or other text element) corresponds based on the definition of the word and the context of the word. The semantic relationship identifier may be a computer module that may be configured to identify semantic relationships of recognized text elements (e.g., words, phrases) in received content. The syntactic relationship identifier may be a computer module that may be configured to conform to formal grammar and determine the grammatical structure of sentences such as, for example, which groups of words are associated as phrases and which word is the subject or object of a verb.

Figure 4:
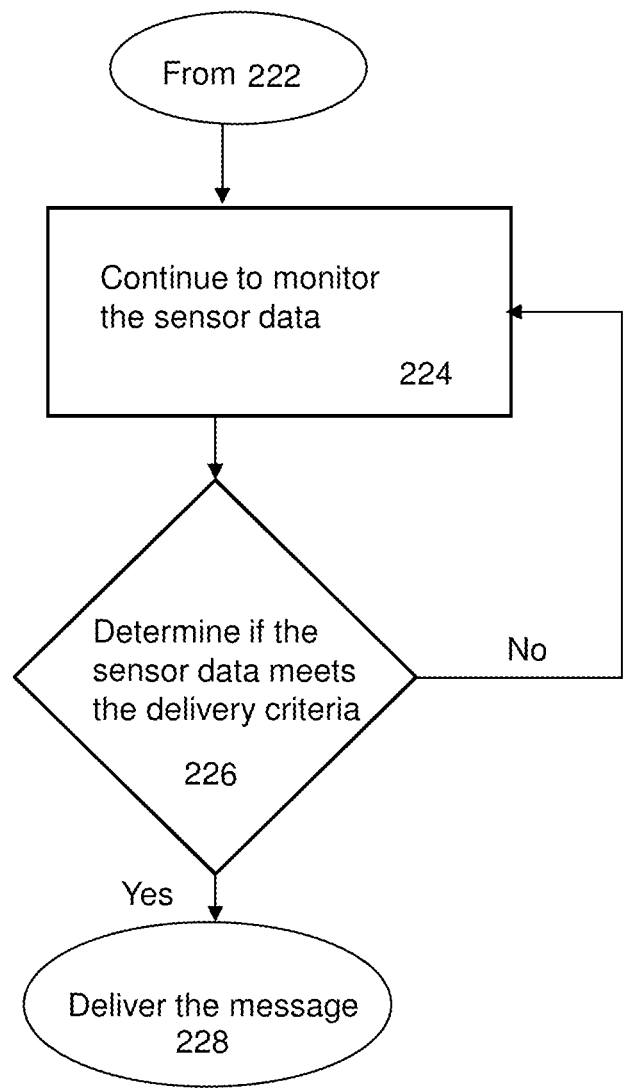
FIG. 4 is a flow chart continuing the method from FIG. 3.

Referring to FIG. 4, when it is determined to suppress message delivery in operation 222, the method 200 includes a sub-process that serves to notify the user of the message at a time when the user is available to received messages. The method 200 includes continued monitoring of the sensor data, at block 224. Receiver user device 102 or computing device in cloud 1250 continues to iteratively monitor sensor data 120 to determine if sensor data 120 meets the delivery criteria 134 (block 226).

Referring to block 228, if current sensor data 120 meets delivery criteria 134, the message is delivered to the receiver user device 102. When message notifications for multiple messages have been suppressed, a single notification that identifies each of the two or more messages may be delivered to the receiver device 102. If the current sensor data 120 does not meet delivery criteria 134, the message is not delivered to the receiver user device 102. Receiver user device 102 or computing device in cloud 1250 continues to iteratively monitor the sensor data 120, at block 224 until sensor data 120 meets the delivery criteria 134 and the message is delivered, at block 228.

The method 200 for using sensor data to control message delivery, as illustrated in FIGS. 3 and 4 in accordance with an embodiment of the present invention, may be more apparent in the following examples. Referring to FIG. 2a, line 1, when a user is cooking, the user does not want to be interrupted. The user sets sensor criteria 132 at 350° F. and delivery criteria 134 for suppressing all messages during the time the sensor criteria 132 is at or above 350° F. As a result, all messages that would have been delivered during the time the sensor data 136 reads X >350° F. (X is the sensor criteria) will be suppressed. Further, once the actual sensor data 136 reads a temperature below 350° F., either notifications, the actual messages, or both will be delivered to the receiver user device 102.

In another example, a user decides to go for a jog and does not want to be disrupted during the workout. The user sets the delivery criteria 134 to suppress all messages except for messages pertaining to weather updates. The user sets the delivery criteria 134 of "Don't Deliver" to apply during the time when sensor data 136 indicates that the user is moving at X >2 miles per hour (mph) (X is the user jogging speed). During the jog, when the user is moving at a speed of 3.5 mph, incoming social messages and notifications are suppressed. However, notifications pertaining to upcoming severe thunderstorms occurring in the area where the user is jogging are delivered to the receiver user device 102 in accordance with a bypass criterion.

Figure 5:
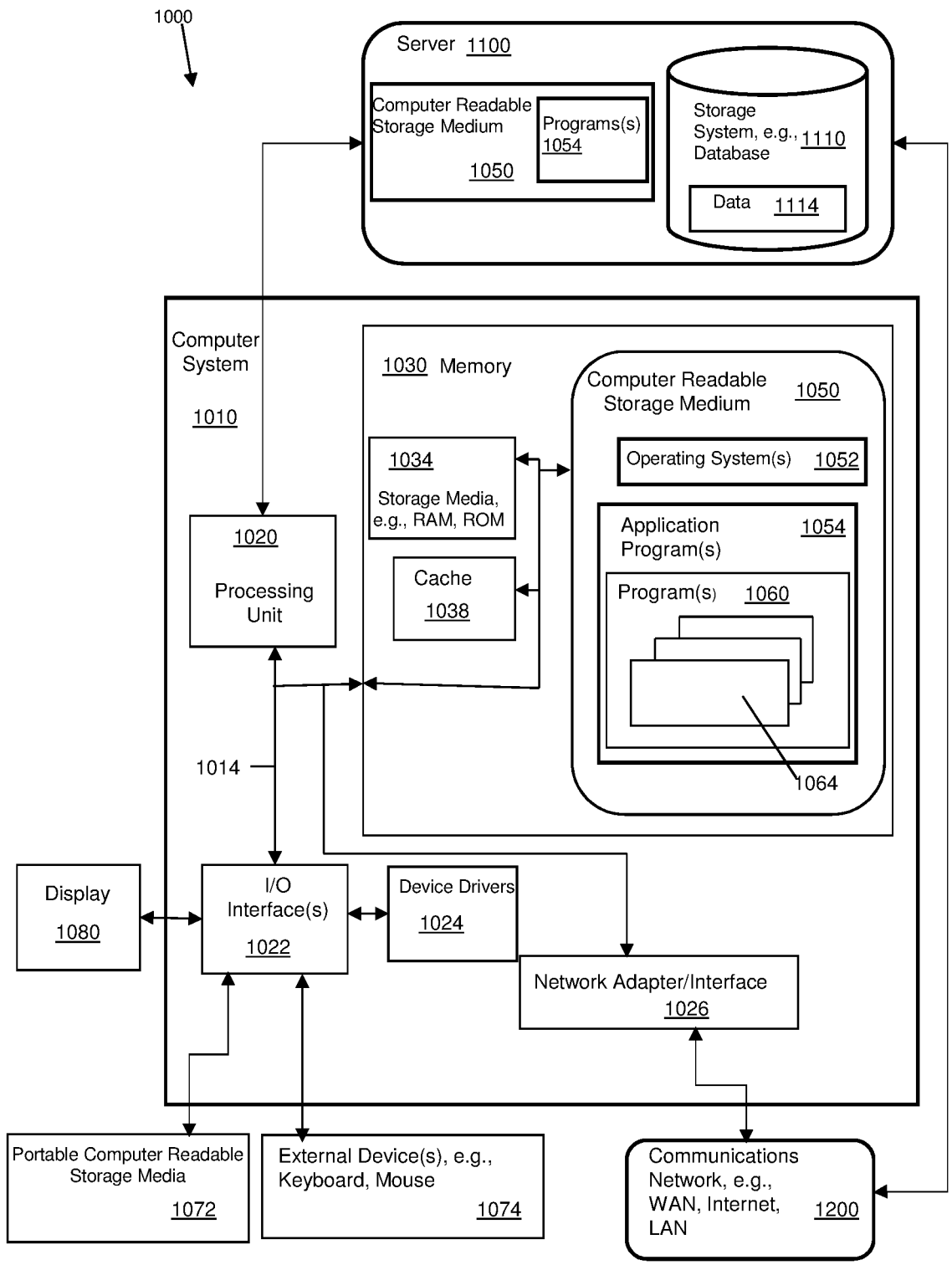
FIG. 5 is a block diagram depicting the hardware components of a system for using sensor data to control message delivery, in accordance with an embodiment of the invention.
Figure 6:
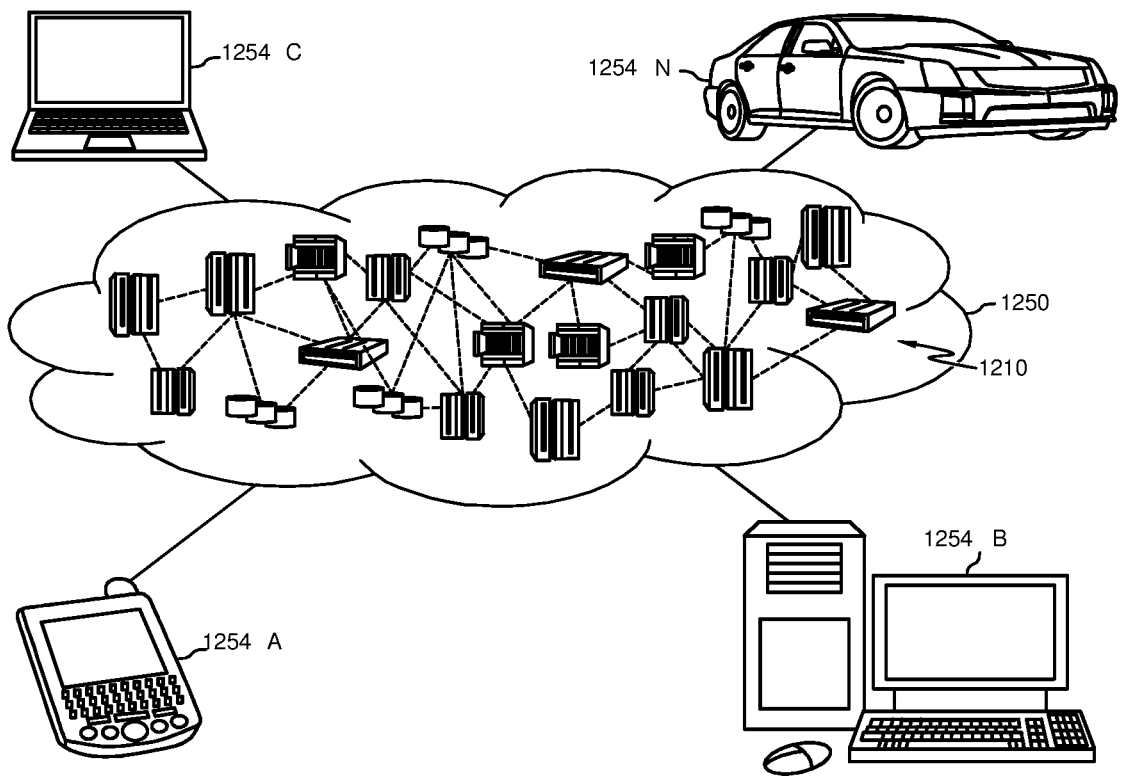
FIG. 6 is a functional block diagram depicting a cloud computing environment, in accordance with an embodiment of the invention.
Figure 7:
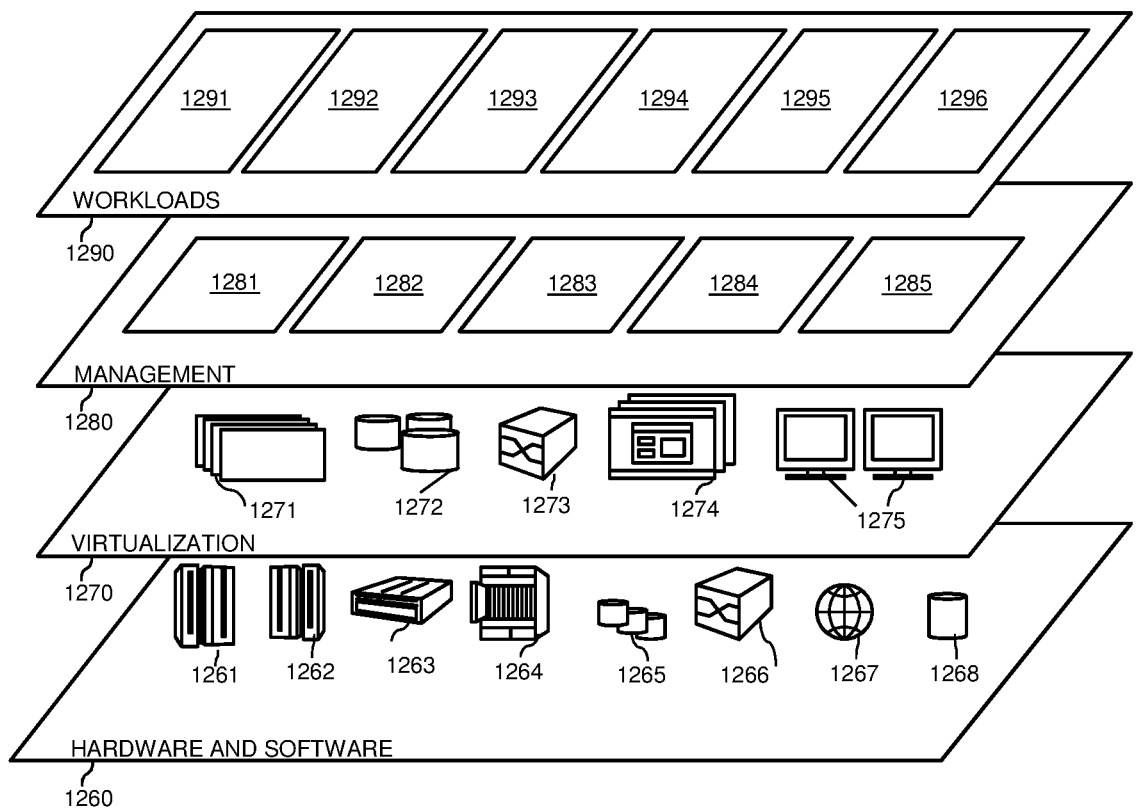
FIG. 7 is a diagram depicting abstraction model layers provided by the cloud computing environment of FIG. 6, in accordance with an embodiment of the invention.

The receiver user device 102, the sender user device 104 and database 114 may include internal and external hardware components, as described in further detail below with respect to FIG. 5. It should be appreciated that FIG. 5 provides only an illustration of one implementation and does not imply any limitations with regard to the environments in which different embodiments may be implemented. Many modifications to the depicted environment may be made. In other embodiments, the receiver user device 102, the sender user device 104 and the plurality of sensors 106 may operate in a cloud computing environment, as depicted in FIGS. 6 and 7.

Referring to FIG. 5, a system 1000 includes a computer system or computer 1010 shown in the form of a generic computing device. The method 200, for example, may be embodied in a program(s) 1060 (FIG. 5) embodied on a computer readable storage device, for example, generally referred to as memory 1030 and more specifically, computer readable storage medium 1050 as shown in FIG. 5. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 6 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 5 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 5, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 200 (FIGS. 3 and 4), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network.

The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 6 are intended to be illustrative only and that computing nodes 1210 and cloud computing environment 1250 can communicate with any type of computerized device over any type of network and/or network addressable connection (e.g., using a web browser).

Referring now to FIG. 7, a set of functional abstraction layers provided by cloud computing environment 1250 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and assessing conditions and recommending modifications 1296.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for message delivery control, the method comprising:
    defining a first sensor criterion and a message delivery action to be triggered by meeting of the first sensor criterion, wherein the first sensor criterion is exceeding a temperature threshold of 350° F.;
    receiving, by a first device communicating with a communications network, a message, the first device having a first device computer;
    receiving, by the first device, oven temperature data from an oven temperature sensor associated with a first user;
    evaluating, by the first device, whether the oven temperature data from the oven temperature sensor meets the first sensor criterion; and
    in response to determining that the oven temperature data meets the first sensor criterion, performing the message delivery action, wherein the message delivery action comprises the first device suppressing at least one of the message and a message notification related to the message from being delivered to the first user.

2. The method of claim 1, wherein the first sensor criterion is based on a user preference.

3. The method of claim 1, further comprising delivering as a bypass at least one of the message and the message notification based on bypass criterion.

4. The method of claim 1, further comprising rerouting at least one of the message and the message notification based on rerouting criterion.

5. The method of claim 1, wherein the first device is remotely located from a second device comprising a second device computer, and
    wherein the suppressing of the at least one of the message and the message notification blocks the second device from receiving the at least one of the message and the message notification.

6. The method of claim 1, wherein the message is received from a sender device, wherein the sender device is separate from an oven holding the oven temperature sensor, and wherein the oven temperature data is captured from the oven.

7. A computer program product for message delivery control, the computer program product comprising:
    a computer-readable storage medium having program instructions embodied therewith, the program instructions being executable by a computer to cause the computer to perform a method comprising:
    defining a first sensor criterion and a message delivery action to be triggered by meeting of the first sensor criterion, wherein the first sensor criterion is exceeding a temperature threshold of 350° F.;
    receiving, via a communications network, a message;
    receiving oven temperature data from an oven temperature sensor associated with a first user;
    evaluating whether the oven temperature data from the oven temperature sensor meets the first sensor criterion; and
    in response to determining that the oven temperature data meets the first sensor criterion, performing the message delivery action, wherein the message delivery action comprises suppressing at least one of the message and a message notification related to the message from being delivered to the first user.

8. The computer program product of claim 7, wherein the first sensor criterion is based on a user preference.

9. The computer program product of claim 7, further comprising delivering as a bypass the at least one of the message and the message notification based on bypass criterion.

10. The computer program product of claim 7, further comprising rerouting the at least one of the message and the message notification based on rerouting criterion.

11. The computer program product of claim 7, wherein the computer is remotely located from another computer, and
    wherein the suppressing of the at least one of the message and the message notification blocks the other computer from receiving the at least one of the message and the message notification.

12. The computer program product of claim 7, wherein the message is received from a sender device, wherein the sender device is separate from an oven holding the oven temperature sensor, and wherein the oven temperature data is captured from the oven.

13. A system for message delivery control, the system comprising:

a processor, a computer readable storage medium, and program instructions stored on the computer readable storage medium that are executable by the processor to cause the system to perform a method comprising:

defining a first sensor criterion and a message delivery action to be triggered by meeting of the first sensor criterion, wherein the first sensor criterion is exceeding a temperature threshold of 350° F.;

receiving, via a communications network, a message;

receiving oven temperature data from an oven temperature sensor associated with a first user;

evaluating whether the oven temperature data from the oven temperature sensor meets the first sensor criterion; and in response to determining that the oven temperature data meets the first sensor criterion, performing the message delivery action, wherein the message delivery action comprises suppressing at least one of the message and a message notification related to the message from being delivered to the first user.

14. The system of claim 13, wherein the method further comprises delivering as a bypass the at least one of the message and the message notification based on bypass criterion.

15. The system of claim 13, wherein the method further comprises rerouting the at least one of the message and the message notification based on rerouting criterion.

16. The system of claim 13, wherein the system is remotely located from another computer, and wherein the suppressing of the at least one of the message and the message notification blocks the other computer from receiving the at least one of the message and the message notification.

17. The system of claim 13, wherein the message is received from a sender device, wherein the sender device is separate from an oven holding the oven temperature sensor, and wherein the oven temperature data is captured from the oven.

* * * * *